United States Patent
Socher et al.

(10) Patent No.: US 12,282,518 B2
(45) Date of Patent: *Apr. 22, 2025

(54) SYSTEMS AND METHODS FOR A SEARCH TOOL OF CODE SNIPPETS

(71) Applicant: SuSea, Inc., Palo Alto, CA (US)

(72) Inventors: Richard Socher, Palo Alto, CA (US); Bryan McCann, Palo Alto, CA (US)

(73) Assignee: SuSea, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/611,031

(22) Filed: Mar. 20, 2024

(65) Prior Publication Data

US 2024/0311434 A1    Sep. 19, 2024

Related U.S. Application Data

(63) Continuation of application No. 18/330,225, filed on Jun. 6, 2023, now Pat. No. 11,966,446.

(60) Provisional application No. 63/446,199, filed on Feb. 16, 2023, provisional application No. 63/349,855, filed on Jun. 7, 2022.

(51) Int. Cl.
    *G06F 16/9535* (2019.01)
    *G06F 16/9538* (2019.01)

(52) U.S. Cl.
    CPC ...... *G06F 16/9535* (2019.01); *G06F 16/9538* (2019.01)

(58) Field of Classification Search
    CPC .. G06F 16/951; G06F 16/953; G06F 16/9532; G06F 16/9535; G06F 16/9536; G06F 16/9538
    See application file for complete search history.

(56) References Cited

U.S. PATENT DOCUMENTS

| | | | |
|---|---|---|---|
| 7,631,294 B2 * | 12/2009 | Rush | G06F 8/70 717/111 |
| 10,671,358 B2 * | 6/2020 | Olivier | G06F 8/36 |
| 2010/0131517 A1 * | 5/2010 | Huang | G06F 16/951 707/E17.014 |
| 2018/0081881 A1 * | 3/2018 | Poddar | G06F 16/24578 |
| 2019/0050319 A1 | 2/2019 | Gondalia et al. | |
| 2019/0227774 A1 | 7/2019 | Banuelos et al. | |
| 2020/0097261 A1 | 3/2020 | Smith et al. | |

(Continued)

OTHER PUBLICATIONS

International Search Report and Written Opinion of PCT/US2023/068081, dated Aug. 23, 2023, 13 pages.

*Primary Examiner* — Kris E Mackes
(74) *Attorney, Agent, or Firm* — Haynes and Boone, LLP

(57) ABSTRACT

The present application generally relates to search engines, and more specifically to systems and methods for a search tool for code snippets. Embodiment described herein provide a customized code search system that generates code search results from customized data sources, extract code snippets from the code search results, and presents the code snippets via a user interface. In one embodiment, the search system adopts a machine learning module to generate and highlight search results from different data sources that include code examples, e.g., in a programming language. To improve search efficiency, in response to a code search query, the search system may extract code snippets from search results from relevant sources in a user interface element, such as user selectable panels.

20 Claims, 13 Drawing Sheets

(56) References Cited

U.S. PATENT DOCUMENTS

| | | |
|---|---|---|
| 2020/0117446 A1 | 4/2020 | Smith et al. |
| 2020/0293291 A1* | 9/2020 | Guan .................. G06F 17/15 |
| 2021/0303989 A1 | 9/2021 | Bird et al. |
| 2021/0357187 A1* | 11/2021 | Clement .................. G06F 8/35 |
| 2022/0107802 A1 | 4/2022 | Rao et al. |
| 2022/0188081 A1 | 6/2022 | Ni et al. |
| 2022/0334835 A1* | 10/2022 | Gottschlich ............ G06N 3/045 |

* cited by examiner

```
main.py ×
 1
 2   # This is a sample Python script.
 3
 4   # Press ^R to execute it or replace it with your code.
 5
 6   # Press Double ⇧ to search everywhere for classes, files,
 7   def print_hi(name): name: 'pyCharm'
 8       # Use a breakpoint in the code line below to debug yo
 9       print(f 'Hi2sd, {name}')
10       print(f 'Hifrewe, {name}')
11       print2 (f 'Hie, {name}')
12       NameError: name 'print2' is not defined
     Fix: # print (f 'Hie, {name}')
13   # Press ⌘F8 to toggle the breakpoint.
14
```

SYSTEMS AND METHODS FOR A SEARCH TOOL OF CODE SNIPPETS

CROSS REFERENCE(S)

The present application is a continuation of and claims priority under 35 U.S.C. 120 to co-pending and commonly-owned U.S. nonprovisional application Ser. No. 18/330,225, filed Jun. 6, 2023 (currently allowed), which in turn is a nonprovisional of and claims priority to commonly-owned U.S. provisional application No. 63/349,855, field Jun. 7, 2022 and 63/446,199, filed Feb. 16, 2023.

The present application is related to co-pending and commonly-owned U.S. nonprovisional application Ser. No. 17/981,102, filed Nov. 4, 2022.

All of the above mentioned applications are hereby expressly incorporated by reference herein in their entirety.

TECHNICAL FIELD

The present application generally relates to search engines, and more specifically to systems and methods for a search tool of code snippets that supports code search from within an integrated development environment (IDE).

BACKGROUND

Search engines allow a user to provide a search query and return search results in response. Search sites such as Google.com, Bing.com, and/or the like usually provide a list of search results to a user from all sorts of data sources. For example, these existing search engines usually crawl web data to collect search results that are relevant to a search query. However, a user has to visit each website to determine whether the result provides relevant information. This can prove frustrating when searching for specific types of content, such as computer code when a programmer user is compiling programming code in an IDE.

BRIEF DESCRIPTION OF THE DRAWINGS

FIGS. 7A-7C provide example UI diagrams illustrating automatic code search within an IDE, according to embodiments described herein.

FIGS. 8A-8D provide example UI diagrams illustrating code search within a search browser window, according to embodiments described herein.

Figure 1:
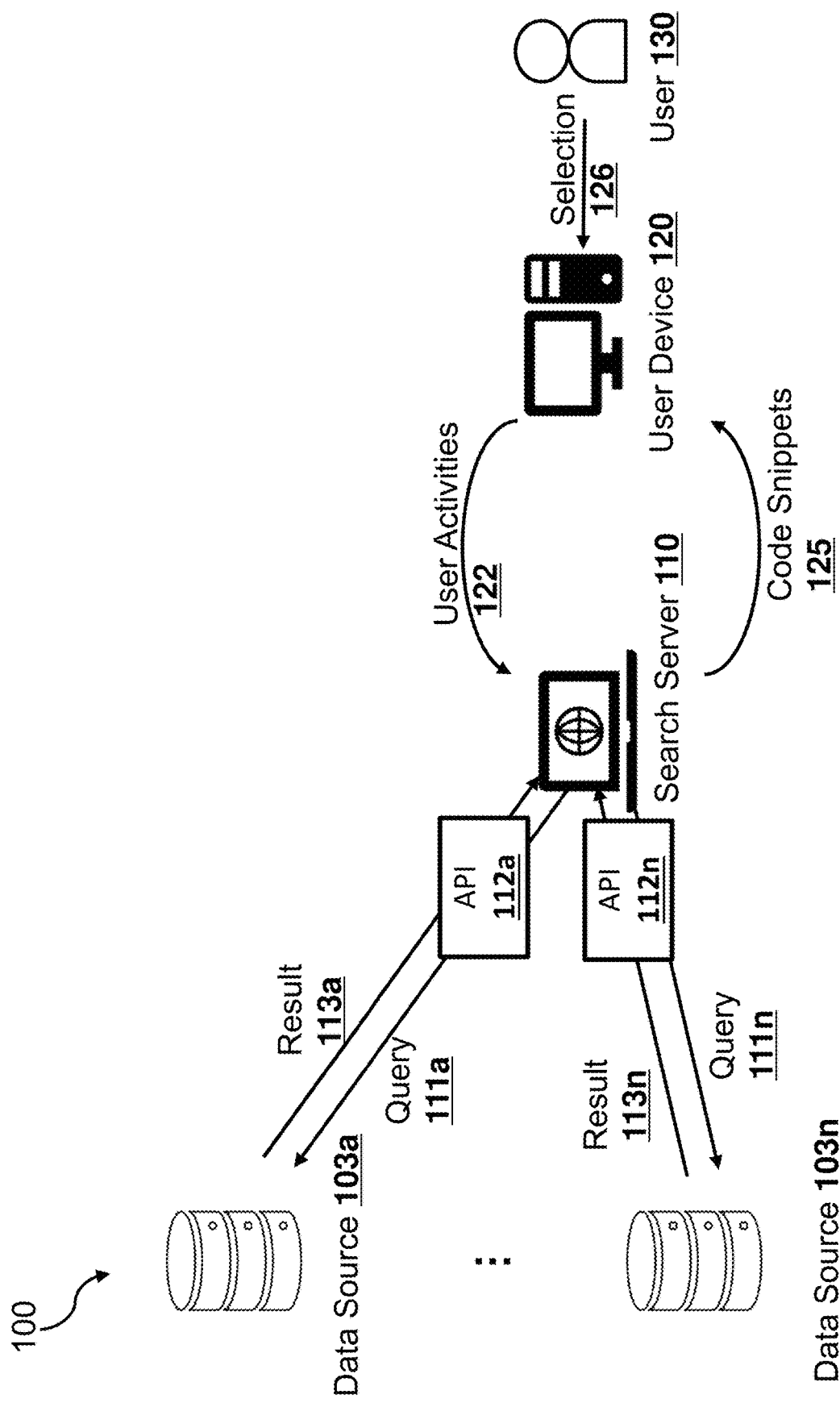
FIG. 1 is a simplified diagram illustrating a code search framework facilitating data flows between a search server and related entities implementing the code search processes described in FIGS. 2-8D, according to one embodiment described herein.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present application generally relates to relates to search engines, and more specifically to systems and methods for a search tool for code snippets.

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Search engines allow a user to provide a search query and return search results in response. Search sites such as Google.com, Bing.com, and/or the like usually provide a list of search results to a user from all sorts of data sources. Some customized search system provides a web-based platform that provides customized search experience for an individual user from different data sources. In one embodiment, the search system adopts a machine learning module to generate and filter search results from all different data sources. For example, the search platform may to ingest user query, user contextual information, and other contextual information to coordinate which data sources are relevant, which corresponding data source application programming interface (APIs) should be contacted, how to parse the user query for each Search APP API, and ultimately the final ranked order of the data source results.

For different search queries, the search system may intelligently recommend what kind of data sources may be most relevant to the specific search query. For example, when a user typed in a search for "Quasi convolutional neural network," the search system may preliminarily determine (or categorize via a classifier) that the search term relates to a technical topic. Therefore, suitable data sources may be a knowledge base such as "Wikipedia," a discussion forum on which users may discuss technical topics such as "Reddit," an archive of scientific manuscript such as "arXiv" and/or the like may most likely be relevant or interesting to the user. The search system may then recommend these data sources to the user. Additional details of the AI-based customized search platform may be found in co-pending and commonly-owned U.S. nonprovisional application Ser. No. 17/981,102, filed Nov. 4, 2022, which is hereby expressly incorporated by reference herein in its entirety.

Using the customized search system, users may engage with dedicated databases for specific searches. For example, a user such as a developer, a programmer, and/or the like, may enter a search query relating to a coding program, such as "sort a list Python," and/or the like. The customized search system may in turn determine that the search query may be conducted through coding program related data sources such as Stack Overflow, W3Schools, Tutorials Point, or other well-known data sources for learning how to program and asking questions related to computer programming, and send the search query to relevant APIs corresponding to these data sources. In this way, a less-seasoned user, such as a rookie developer or even a layperson, may use the customized search system to enter a natural language query for a code project to search through these dedicated code databases, which are often scattered and difficult for a layperson to use, even without a certain level of professional knowledge to enter the most effective search strings.

On the other hand, existing search engines usually provide a list of URL links that potentially contain content relating to the search query. In this way, to review or retrieve the search results, a user often has to visit each website to determine whether content from the respective website provides relevant information. For example, when a user is searching for coding related content, a user may often need to review an entire webpage, look for and determine whether there is and what part of content from the webpage can be applied in a coding environment. The user may then need to manually copy, paste and edit the content (e.g., a code segment) from the webpage into a coding environment. Thus, not only this search process requires a certain level of professional knowledge from the user to be able to understand contents on the webpage, it can also be time consuming and inconvenient for the user to constantly working through different windows such as a search engine, a webpage of search results, and an IDE window.

Embodiment described herein provide a customized code search system that generates code search results from customized data sources, extract code snippets from the code search results, and presents the code snippets via a user interface. In one embodiment, the search system adopts a machine learning module to generate and highlight search results from different data sources that include code examples, e.g., in a programming language. To improve search efficiency, in response to a code search query, the search system may extract code snippets from search results from relevant sources in a user interface element, such as user selectable panels. In this way, instead of having to visiting and reviewing contents following each search result link, the user may directly apply and incorporate the code snippet from the user interface panels into an IDE.

For example, if a user enters a query "sort a list in Python," the search engine may determine that the search query relates to coding programs, and determine a plurality of coding program data sources to conduct the search, such as Stack Overflow, W3Schools, Tutorials Point, and/or the like. Instead of returning a number of web links from these data sources that discuss algorithms of "sorting a list," the search engine may parse the search results web links for example Python snippets that are applicable, and return the example Python snippets in one or more viewable web widgets, e.g., side panels within a search browser. A user can click on the panel of a code snippet from a data source which provides the code snippet, e.g., Stack Overflow, and see a list of search results such as discussion threads and code examples relating to a search query that are provided specifically from the data source "Stack Overflow." For another example, if the user clicks on the panels for "Tutorials Point," code snippets from Tutorials Point related to the search query may be provided.

Embodiments described herein further provide an in-IDE code search tool that is integrated into an IDE environment to automatically search for code snippets and assist an ongoing coding project within the IDE window. In one embodiment, a search client component may be integrated with an IDE implemented on a user device, which in turn monitors user activities relating to a code segment within the IDE. The monitored coding activities (e.g., a portion of coding segment, cursor movement, user pause time, and/or the like) may then be provided to the search system, which may in turn determine, by a neural network based prediction model, a code search query based on the monitored user activities. The search system may then conduct a search on relevant coding data sources based on the code search code query and receive search results. The search system may further extract code snippets from webpages of content following the search result links and return the code snippets to the client component. The client component in turn displays the code snippet at a user interface within the IDE, which allows a user to elect to incorporate a code snippet into the current coding project within the IDE.

For example, a pause by the user may indicate that they are thinking about how a certain coding aspect works. The search system may discern, using context above and/or below where the user is currently typing, to identify potential search queries that may be useful to the user. The search system may then perform a search and display search results to the user. These search results may be displayed to the user in a window pane as part of the IDE, without requiring the user to open a separate window. Code corresponding to the search results may be displayed to the user, and the user may select a preferred search result that may be inserted directly into the written code without the need for the user to copy and paste code into the written code.

In this way, the automatic in-IDE code search system largely improves search and coding efficiency and user programming experience. In addition, various neural network based modules are employed by the in-IDE code search system, resulting in neural network technology that is capable of conducting customized code searches and returning readily applicable code snippets for an IDE. Neural network technology has thus been improved in search engines and computer-assisted technology, as further discussed in relation to FIG.

FIG. 1 is a simplified diagram illustrating a code search framework 100 facilitating data flows between a search server and related entities implementing the code search processes described in FIGS. 2-8D, according to one embodiment described herein. The code search framework 100 includes a user 130 operating a user device 120, a search server 110, and one or more data sources 103a-n which are connected to the server 110 through one or more application programming interfaces (APIs) 112a-n.

The user device 120 may interact with the search server 110 by providing user activities 122 via a client component installed with an IDE application running on the user device 120. In one implementation, the user activities 122 may include a user manual entry on a searching provided by the user, e.g., "sort a list Python."

In another implementation, user activities 122 may include monitored user coding activities within an IDE on the user device 120. For example, a client component of a customized search system may be delivered from the search server 110 to integrate into an IDE running at the user device 120, which allow users to utilize the search system when coding within the IDE without a search being initiated by the user. For example, user activities 122 may include what a user is coding, how long a user has been typing, when a user moves to a new line, when a user pauses and how long, whether the current line contains functional code, user cursor movement scrolling up and down indicating user attention to a particular code segment, the content of lines before and after the current line selected by the user, and/or the like. This information may indicate to the search system when a search would be useful for the user, and provide search results to the user without the user first initiating the search. The search system client component will observe the coding activities for the search server 110 to determine at decision points based on the inputs received from the IDE when to perform a search and provide search results to the user.

In another implementation, the user device 120 may further provide search context collected by code projects the user has previously written, code files that are concurrently open, other search terms that the user has entered on a separate browser window, and/or the like, may provide contextual information useful in determining potential search needs for an individual writing code. In some embodiments, this context information may be used along with information gathered by the search system regarding user preferences, previous searches by the user, trends in search activity, and other contextual information to determine additional useful search elements that would assist the user while writing code.

In one embodiment, the search server 110 may determine a search data source. For example, when a search query is entered through a search browser window, the search server 110 may engage neural network based AI models to predict relevant data sources for the search, such as coding related data sources. Additional details of determining specific data sources based on the search query may be found in co-pending and commonly-owned U.S. nonprovisional application Ser. No. 17/981,102, filed Nov. 4, 2022.

For another example, when the search server 110 receives user coding activities 122 from a client component within the IDE, the search server 110, the search server 110 may determine data sources that have been pre-defined as coding related for the search. The determined data sources may be further subject to prior user interactions, e.g., a user disapproving a search result from certain data sources, a user pre-configured preferred data sources, and/or the like.

In one embodiment, the search server 110, upon receiving user activities 122, may determine when and whether to generate a search query. For example, as further described in relation to FIGS. 2-5, the search server 110 may host one or more neural network based prediction modules. The prediction module may generate a coding search query based on user activities 122 and/or other context information when the prediction module determines a search shall be performed at a time point depending on the received user activities 122. For example, when the user activities 122 indicates that a user has an active IDE window but has paused more than a threshold of time, a user has been scrolling up and down reviewing a set of lines for more than a number of times, an error has been detected at the current coding place, and/or the like.

The search server 110 may then generate customized search queries according to each determined data source and send the customized search queries 111*a-n* to respective data sources 103*a-n* through respective APIs 112*a-n*. In response, the data sources 103*a-n* may return query results 112*a-n* in the form of links to webpages and/or cloud files to the search server 110.

Figure 7B:
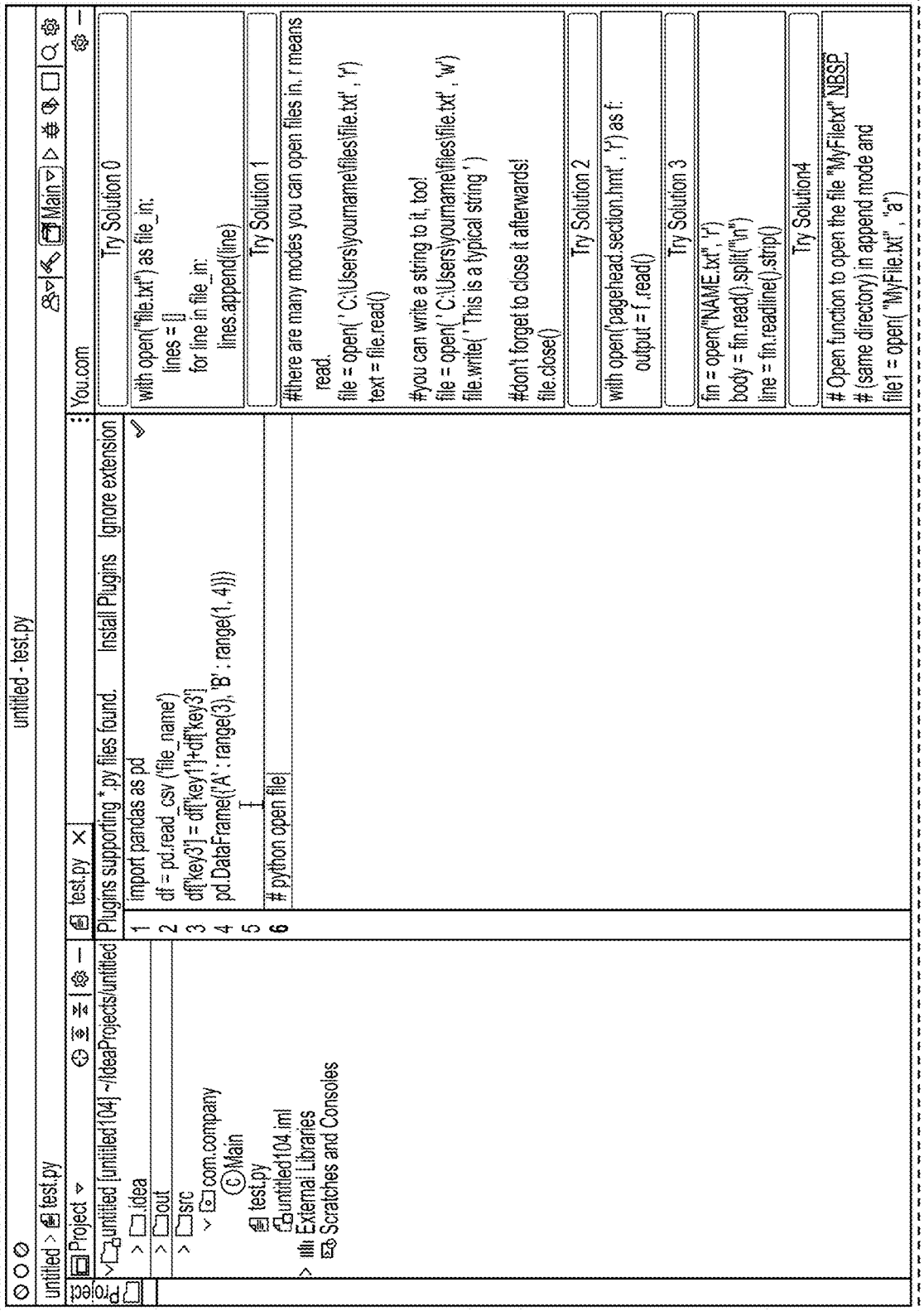
Figure 7C:
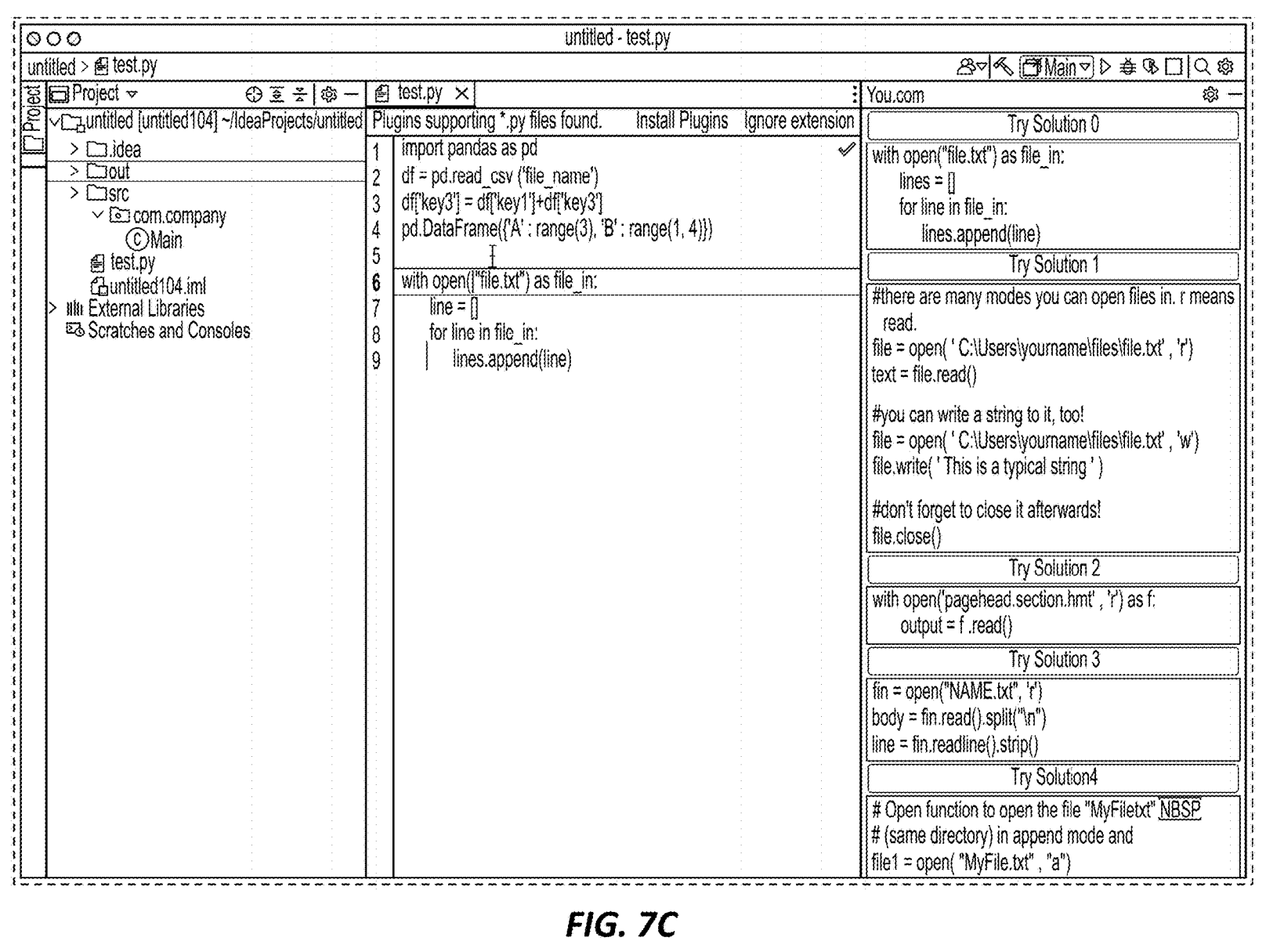

In one embodiment, instead of presenting links to search results (e.g., webpages) to a user device 120, the search server 110 may extract code snippets from the search results, and return actual code snippets 125 for display at the user device 120. For example, the client component at the user device 120 may display code snippets at a panel within a search browser (e.g., as shown in FIGS. 8A-8D) and within the IDE (e.g., as shown in FIGS. 7A-7C).

In this way, the user 130 may submit a selection 126, e.g., by choosing to incorporate a code snippet presented on the user interface panel directly into the ongoing coding project at the IDE.

Figure 2:
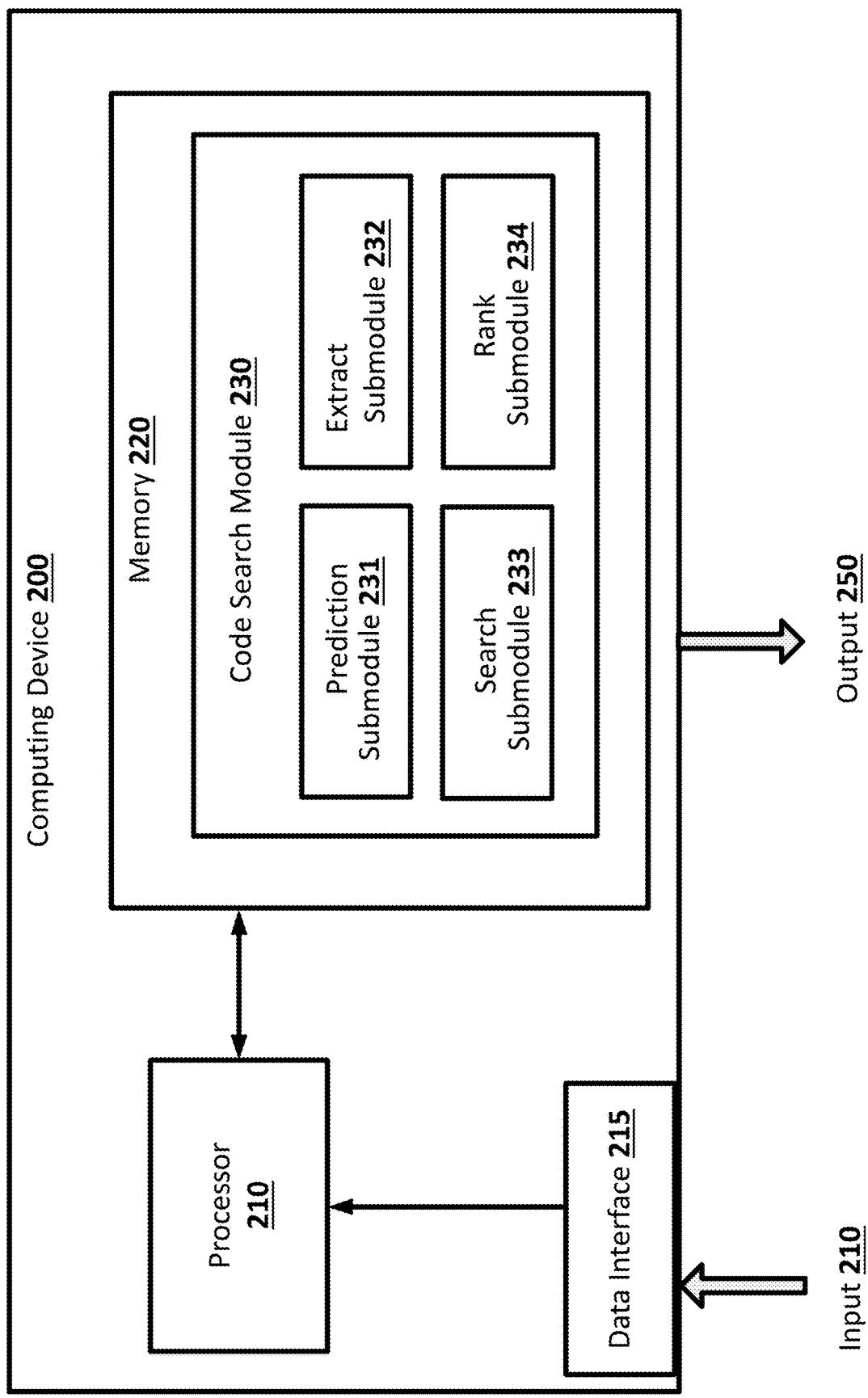
FIG. 2 is a simplified diagram illustrating a computing device implementing the search server in the code search framework described in FIGS. 1, according to one embodiment described herein.

FIG. 2 is a simplified diagram illustrating a computing device implementing the search server in the code search framework described in FIGS. 1, according to one embodiment described herein. As shown in FIG. 2, computing device 200 includes a processor 210 coupled to memory 220. Operation of computing device 200 is controlled by processor 210. And although computing device 200 is shown with only one processor 210, it is understood that processor 210 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 200. Computing device 200 may be implemented as a stand-alone subsystem, as a board added to a computing device, and/or as a virtual machine.

Memory 220 may be used to store software executed by computing device 200 and/or one or more data structures used during operation of computing device 200. Memory 220 may include one or more types of machine-readable media. Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 210 and/or memory 220 may be arranged in any suitable physical arrangement. In some embodiments, processor 210 and/or memory 220 may be implemented on a same board, in a same package (e.g., system-in-package), on a same chip (e.g., system-on-chip), and/or the like. In some embodiments, processor 210 and/or memory 220 may include distributed, virtualized, and/or containerized computing resources. Consistent with such embodiments, processor 210 and/or memory 220 may be located in one or more data centers and/or cloud computing facilities.

In some examples, memory 220 may include non-transitory, tangible, machine readable media that includes executable code that when run by one or more processors (e.g., processor 210) may cause the one or more processors to perform the methods described in further detail herein. For example, as shown, memory 220 includes instructions for code search module 230 that may be used to implement and/or emulate the systems and models, and/or to implement any of the methods described further herein. code search module 230 may receive input 240 such as an input data (e.g., code activity data) via the data interface 215 and generate an output 250 which may be a predicted search query. Examples of the input data may include code activity data 122 in FIG. 1, and examples of the output data may include a search query 111*a-n*. In another example, the input 240 may be a received search query and the output 250 may be code snippets 125 in response to the search query.

The data interface 215 may comprise a communication interface, a user interface (such as a voice input interface, a graphical user interface, and/or the like). For example, the computing device 200 may receive the input 240 (such as a training dataset) from a networked database via a communication interface. Or the computing device 200 may receive the input 240, such as a user entered search query, from a user via the user interface.

In some embodiments, the code search module 230 is configured to generate output code snippets to a user device (e.g., 120 in FIG. 1). The code search module 230 may further include a prediction submodule 231, an extract submodule 232, a search submodule 233, and a rank submodule 234. The prediction submodule 231 may generate a search query based on received input coding activities (e.g., 122 in FIG. 1). For example, the prediction submodule 231 may also determine when a code search is to be triggered, and the generation of a search query indicates the time point when a code search is determined to be triggered. The search submodule 233 may determine one or more data sources for the code search, e.g., based on user configuration of preferences, user past behavior indicating a preference, the search query, a coding data source type, and/or the like. The search submodule 233 may further generate customized queries according to each data sources, and transmits the customized queries to the corresponding APIs (e.g., 112a-n in FIG. 1) and receives search results from the APIs. The extract submodule 232 may extract code snippets from each search result, which was originally in the form of links to a webpage and/or cloud file. The rank submodule 234 may rank the code snippets, e.g., based on completeness, reputation of the data source, relevance, and/or the like. Additional functionality of the submodules 231-234 may be further described in relation to FIG. 5.

Some examples of computing devices, such as computing device 200 may include non-transitory, tangible, machine readable media that include executable code that when run by one or more processors (e.g., processor 210) may cause the one or more processors to perform the processes of method. Some common forms of machine-readable media that may include the processes of method are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Figure 3:
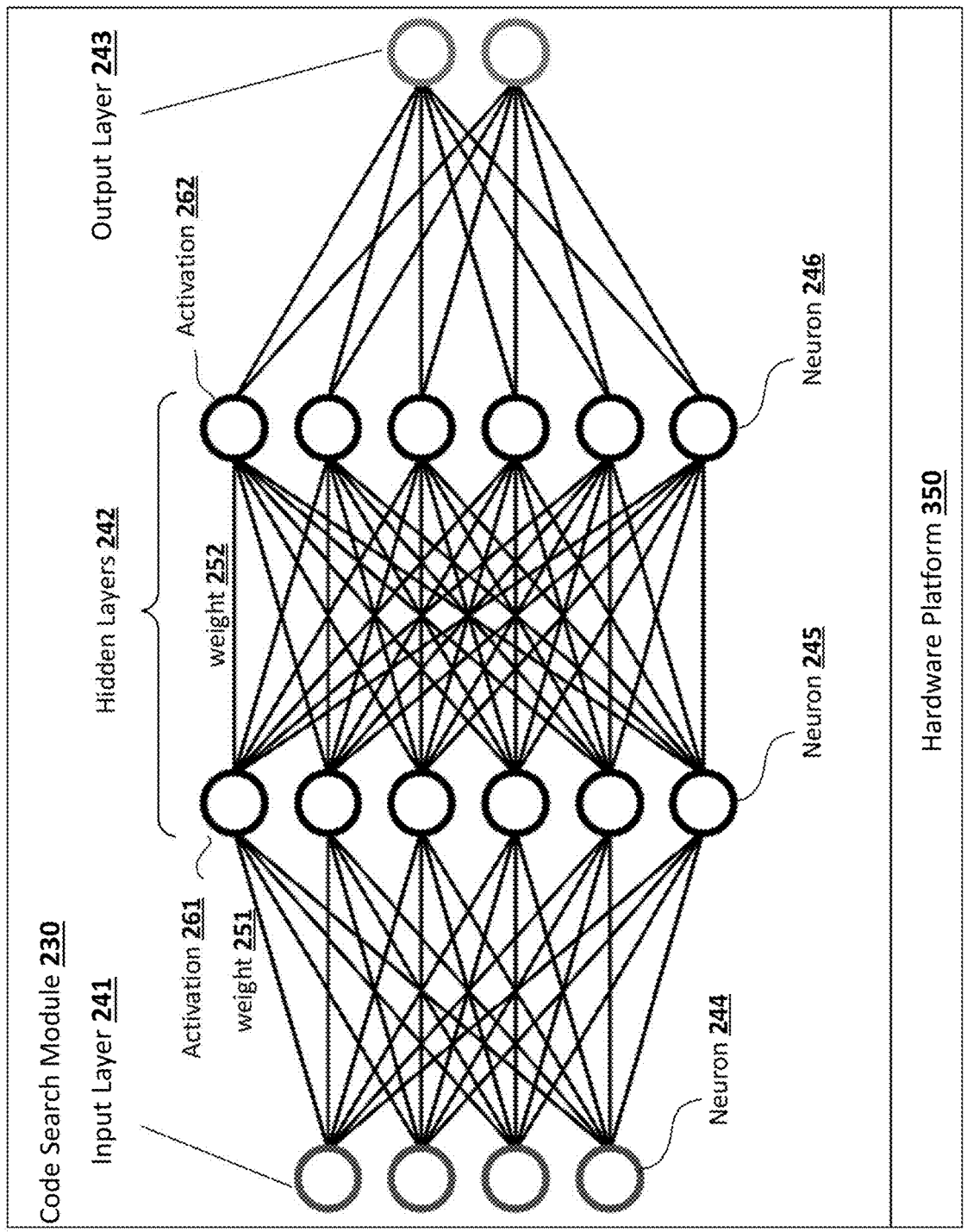
FIG. 3 is a simplified diagram illustrating the neural network structure implementing the code search module 230 described in FIG. 2, according to one embodiment described herein.

FIG. 3 is a simplified diagram illustrating the neural network structure implementing the code search module 230 described in FIG. 2, according to one embodiment described herein. In one embodiment, the code search module 230 and/or one or more of its submodules 231-234 may be implemented via an artificial neural network structure shown in FIG. 2. The neural network comprises a computing system that is built on a collection of connected units or nodes, referred to as neurons (e.g., 244, 245, 246). Neurons are often connected by edges, and an adjustable weight (e.g., 251, 252) is often associated with the edge. The neurons are often aggregated into layers such that different layers may perform different transformations on the respective input and output transformed input data onto the next layer.

For example, the neural network architecture may comprise an input layer 241, one or more hidden layers 242 and an output layer 243. Each layer may comprise a plurality of neurons, and neurons between layers are interconnected according to a specific topology of the neural network topology. The input layer 241 receives the input data (e.g., 240 in FIG. 2A), such as use coding activities (e.g., 122 in FIG. 1), a user entered search query, and/or the like. The number of nodes (neurons) in the input layer 241 may be determined by the dimensionality of the input data (e.g., the length of a vector of give an example of the input). Each node in the input layer represents a feature or attribute of the input.

The hidden layers 242 are intermediate layers between the input and output layers of a neural network. It is noted that two hidden layers 242 are shown in FIG. XX for illustrative purpose only, and any number of hidden layers may be utilized in a neural network structure. Hidden layers 242 may extract and transform the input data through a series of weighted computations and activation functions.

For example, as discussed in FIG. 2, the code search module 230 receives an input 240 of user coding activities and transforms the input into an output 250 of search code snippets. To perform the transformation, each neuron receives input signals, performs a weighted sum of the inputs according to weights assigned to each connection (e.g., 251, 252), and then applies an activation function (e.g., 261, 262, etc.) associated with the respective neuron to the result. The output of the activation function is passed to the next layer of neurons or serves as the final output of the network. The activation function may be the same or different across different layers. Example activation functions include but not limited to Sigmoid, hyperbolic tangent, Rectified Linear Unit (ReLU), Leaky ReLU, Softmax, and/or the like. In this way, after a number of hidden layers, input data received at the input layer 241 is transformed into rather different values indicative data characteristics corresponding to a task that the neural network structure has been designed to perform.

The output layer 243 is the final layer of the neural network structure. It produces the network's output or prediction based on the computations performed in the preceding layers (e.g., 241, 242). The number of nodes in the output layer depends on the nature of the task being addressed. For example, in a binary classification problem, the output layer may consist of a single node representing the probability of belonging to one class. In a multi-class classification problem, the output layer may have multiple nodes, each representing the probability of belonging to a specific class.

Therefore, the code search module 230 and/or one or more of its submodules 231-234 may comprise the transformative neural network structure of layers of neurons, and weights and activation functions describing the non-linear transformation at each neuron. Such a neural network structure is often implemented on one or more hardware processors 210, such as a graphics processing unit (GPU). An example neural network may be [give an example of neural models], and/or the like.

In one embodiment, the code search module 230 and its submodules 231 may be implemented by hardware, software and/or a combination thereof. For example, the code search module 230 and its submodules 231 may comprise a specific neural network structure implemented and run on various hardware platforms 250, such as but not limited to CPUs (central processing units), GPUs (graphics processing units), FPGAs (field-programmable gate arrays), Application-Specific Integrated Circuits (ASICs), dedicated AI accelerators like TPUs (tensor processing units), and specialized hardware accelerators designed specifically for the neural network computations described herein, and/or the like. Example specific hardware for neural network structures may include, but not limited to Google Edge TPU, Deep Learning Accelerator (DLA), NVIDIA AI-focused GPUs, and/or the like. The hardware 250 used to implement th neural network structure is specifically configured depends on factors such as the complexity of the neural network, the scale of the tasks (e.g., training time, input data scale, size of training dataset, etc.), and the desired performance.

In one embodiment, the neural network based code search module 230 and one or more of its submodules 231-234 may be trained by iteratively updating the underlying parameters (e.g., weights 251, 252, etc., bias parameters and/or coefficients in the activation functions 261, 262 associated with neurons) of the neural network based on a loss objective. For example, during forward propagation, the training data such as past coding activities are fed into the neural network. The data flows through the network's layers 241, 242, with each layer performing computations based on its weights, biases, and activation functions until the output layer 243 produces the network's output 250, such as a predicted code search query.

The output generated by the output layer 243 is compared to the expected output (e.g., a "ground-truth" such as the corresponding give an example of ground truth label), e.g., the actual code search query corresponding to the coding activities from the training data, to compute a loss function that measures the discrepancy between the predicted output and the expected output. For example, the loss function may be cross entropy, mean square error (MSE), and/or the like. Given the loss, the negative gradient of the loss function is computed with respect to each weight of each layer individually. Such negative gradient is computed one layer at a time, iteratively backward from the last layer 243 to the input layer 241 of the neural network. These gradients quantify the sensitivity of the network's output to changes in the parameters. The chain rule of calculus is applied to efficiently calculate these gradients by propagating the gradients backward from the output layer 243 to the input layer 241.

Parameters of the neural network are updated backwardly from the last layer to the input layer (backpropagating) based on the computed negative gradient using an optimization algorithm to minimize the loss. The backpropagation from the last layer 243 to the input layer 241 may be conducted for a number of training samples in a number of iterative training epochs. In this way, parameters of the neural network may be gradually updated in a direction to result in a lesser or minimized loss, indicating the neural network has been trained to generate a predicted output value closer to the target output value with improved prediction accuracy. Training may continue until a stopping criterion is met, such as reaching a maximum number of epochs or achieving satisfactory performance on the validation data. At this point, the trained network can be used to make predictions on new, unseen data, such as an automatic search-based IDE.

Therefore, the training process transforms the neural network into an "updated" trained neural network with updated parameters such as weights, activation functions, and biases. The trained neural network thus improves neural network technology in cloud-based search systems.

Figure 4:
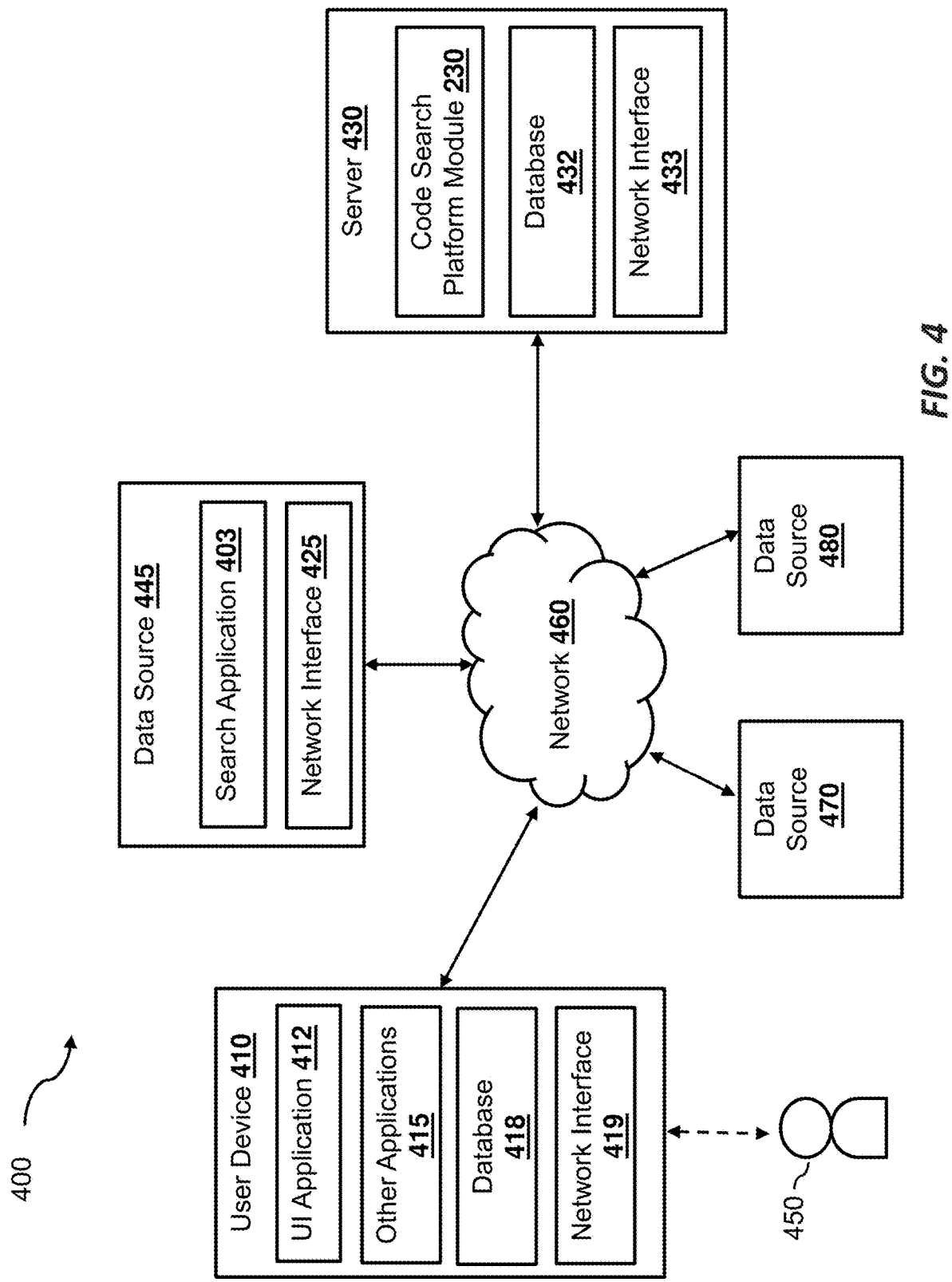
FIG. 4 is a simplified block diagram of a networked system suitable for implementing the code search framework described in FIG. 1 and other embodiments described herein.

FIG. 4 is a simplified block diagram of a networked system 400 suitable for implementing the code search framework described in FIG. 1 and other embodiments described herein. In one embodiment, system 400 includes the user device 410 which may be operated by user 440, data vendor servers 445, 470 and 480, server 430, and other forms of devices, servers, and/or software components that operate to perform various methodologies in accordance with the described embodiments. Exemplary devices and servers may include device, stand-alone, and enterprise-class servers which may be similar to the computing device 200 described in FIG. 2, operating an OS such as a MICROSOFT® OS, a UNIX® OS, a LINUX® OS, or other suitable device and/or server-based OS. It can be appreciated that the devices and/or servers illustrated in FIG. 4 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

The user device 410, data vendor servers 445, 470 and 480, and the server platform 430 (e.g., similar to search server 110 in FIG. 1) may communicate with each other over a network 460. User device 410 may be utilized by a user 440 (e.g., a driver, a system admin, etc.) to access the various features available for user device 410, which may include processes and/or applications associated with the server 430 to receive an output data anomaly report.

User device 410, data vendor server 445, and the server 430 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 400, and/or accessible over network 460.

User device 410 may be implemented as a communication device that may utilize appropriate hardware and software configured for wired and/or wireless communication with data vendor server 445 and/or the server 430. For example, in one embodiment, user device 410 may be implemented as an autonomous driving vehicle, a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

User device 410 of FIG. 4 contains a user interface (UI) application 412, and/or other applications 416, which may correspond to executable processes, procedures, and/or applications with associated hardware. For example, the user device 410 may receive a message indicating code snippets (e.g., 125 in FIG. 1) from the server 430 and display the message via the UI application 412 (e.g., see FIGS. 7A-8D). In other embodiments, user device 410 may include additional or different modules having specialized hardware and/or software as required.

In various embodiments, user device 410 includes other applications 416 as may be desired in particular embodiments to provide features to user device 410. For example, the other applications 416 may include an IDE application for software development, which often includes a code editor application that may operate with the UI application 412, and a compiler. For another example, other applications 416 may include security applications for implementing client-side security features, programmatic client applications for interfacing with appropriate application programming interfaces (APIs) over network 460, or other types of applications. Other applications 416 may also include communication applications, such as email, texting, voice, social networking, and IM applications that allow a user to send and receive emails, calls, texts, and other notifications through network 460. For example, the other application 416 may be an email or instant messaging application that receives a prediction result message from the server 430. Other applications 416 may include device interfaces and other display modules that may receive input and/or output information. For example, other applications 416 may contain software programs for asset management, executable by a processor, including a graphical user interface (GUI) configured to provide an interface to the user 440 to view code snippets.

User device 410 may further include database 418 stored in a transitory and/or non-transitory memory of user device 410, which may store various applications and data and be utilized during execution of various modules of user device 410. Database 418 may store user profile relating to the user 440, predictions previously viewed or saved by the user 440, historical data received from the server 430, and/or the like. In some embodiments, database 418 may be local to user device 410. However, in other embodiments, database 418 may be external to user device 410 and accessible by user device 410, including cloud storage systems and/or databases that are accessible over network 460.

User device 410 includes at least one network interface component 417 adapted to communicate with data vendor server 445 and/or the server 430. In various embodiments, network interface component 417 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Data vendor server 445 may correspond to a server that hosts database 419 to provide training datasets including user coding activities, corresponding search queries and code snippets to the server 430. The database 419 may be implemented by one or more relational database, distributed databases, cloud databases, and/or the like.

The data vendor server 445 includes at least one network interface component 426 adapted to communicate with user device 410 and/or the server 430. In various embodiments, network interface component 426 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. For example, in one implementation, the data vendor server 445 may send asset information from the database 419, via the network interface 426, to the server 430.

The server 430 may be housed with the code search module 230 and its submodules described in FIG. 2. In some implementations, code search module 230 may receive data from database 419 at the data vendor server 445 via the network 460 to generate code snippets. The generated code snippets may also be sent to the user device 410 for review by the user 440 via the network 460.

The database 432 may be stored in a transitory and/or non-transitory memory of the server 430. In one implementation, the database 432 may store data obtained from the data vendor server 445. In one implementation, the database 432 may store parameters of the code search module 230. In one implementation, the database 432 may store previously searched code snippets, user previously written code projects, user previous coding activities, and/or the like.

In some embodiments, database 432 may be local to the server 430. However, in other embodiments, database 432 may be external to the server 430 and accessible by the server 430, including cloud storage systems and/or databases that are accessible over network 460.

The server 430 includes at least one network interface component 433 adapted to communicate with user device 410 and/or data vendor servers 445, 470 or 480 over network 460. In various embodiments, network interface component 433 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 460 may be implemented as a single network or a combination of multiple networks. For example, in various embodiments, network 460 may include the Internet or one or more intranets, landline networks, wireless networks, and/or other appropriate types of networks. Thus, network 460 may correspond to small scale communication networks, such as a private or local area network, or a larger scale network, such as a wide area network or the Internet, accessible by the various components of system 400.

Figure 5:
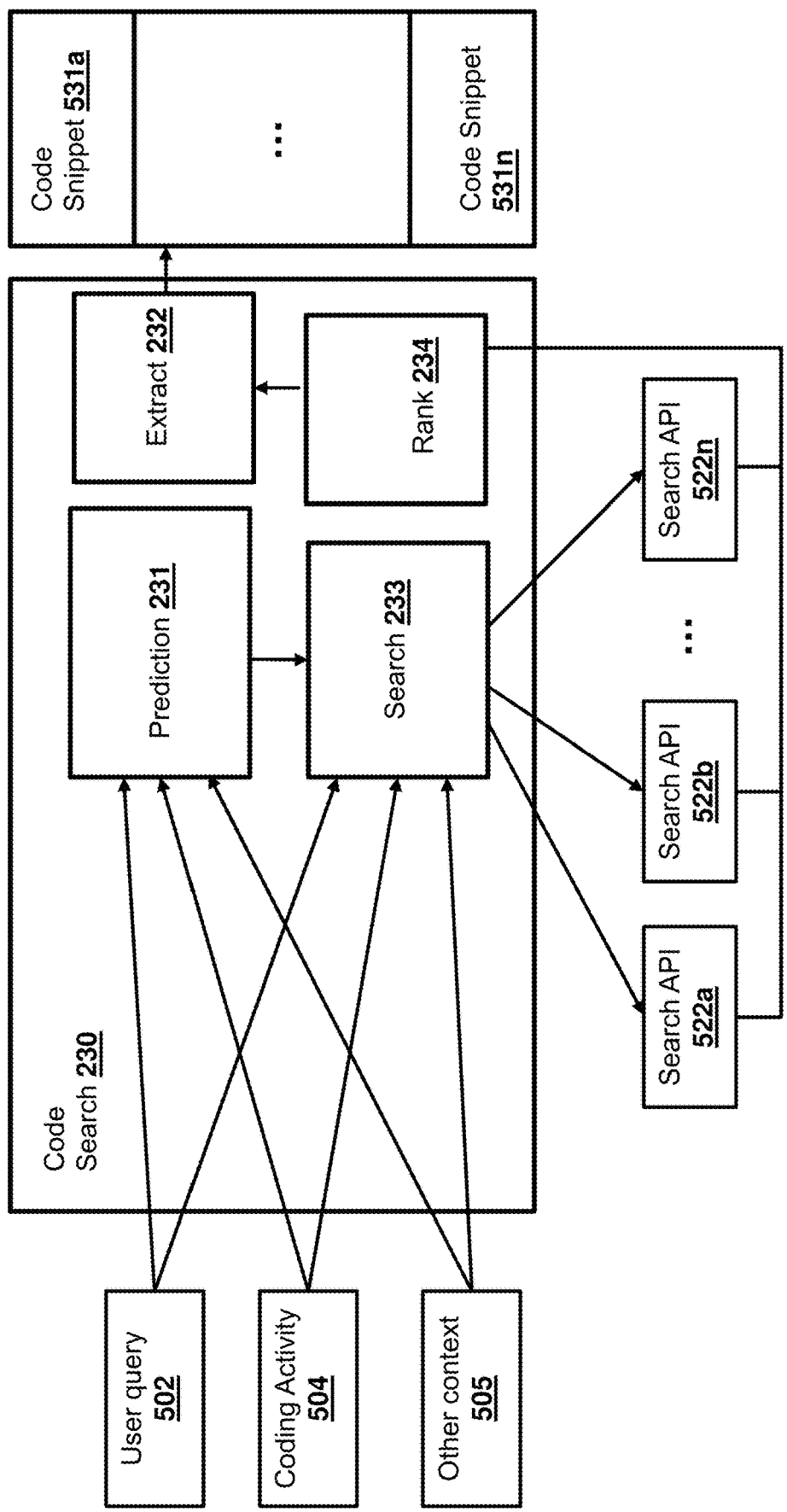
FIG. 5 is a simplified diagram illustrating an example architecture of a code search platform implemented at the search server, according to embodiments described herein.

FIG. 5 is a simplified diagram illustrating an example architecture of a code search platform implemented at the search server, according to embodiments described herein. The code search module 230 may comprise a software and a hardware platform that is implemented at the search server 110 in FIG. 1, and/or the server 430 in FIG. 3. For example, the code search module 230 may be implemented based on a neural network structure shown in FIG. 3.

In one embodiment, the prediction module 231 may receive any of a user query 502, user condign activity 504, and/or other context 505. For example, when a user query 502 is received, e.g., a user manual entry on a searching provided by the user, e.g., "sort a list Python," the prediction module 231 may determine immediately pass the user query 502 to the search module 233 to launch a code search.

For another example, if no user query 502 is received, the prediction module 231 may predict a search query based on the user coding activity 504 and other context 505. The user coding activity 504 may comprise what a user is coding how long a user has been typing, when a user moves to a new line, when a user pauses and how long, whether the current line contains functional code, user cursor movement scrolling up and down indicating user attention to a particular code segment, the content of lines before and after the current line selected by the user, and/or the like. Other context 505 may comprise code projects the user has previously written, code files that are concurrently open, other search terms that the user has entered on a separate browser window, and/or the like, which may provide contextual information useful in determining potential search needs for an individual writing code. In some embodiments, this context information 505 may further comprise user preferences, previous searches by the user, trends in search activity, and other contextual information to determine additional useful search elements that would assist the user while writing code.

In one embodiment, the prediction module 231 may concatenate input information such as user coding activity 504, user query 502 (optional) and other context 505 into an input sequence of tokens, and generate a predicted code search query. The prediction may be performed periodically, intermittently and/or constantly depending on the constantly updated user coding activity 504. In one implementation, absent a direct user query 502 for a codes search, the prediction module 231 may also make a prediction on whether the input sequence of user coding activity 504 and other context 505 would trigger a code search, e.g., when the user activities 122 indicates that a user has an active IDE window but has paused more than a threshold of time, a user has been scrolling up and down reviewing a set of lines for more than a number of times, an error has been detected at the current coding place, and/or the like.

The prediction module 231 may be trained on a dataset of previous coding activities 504, previous context 505, and (optional) previous user query 502, and a corresponding ground-truth code search query associated with the coding activities.

The search module 232 may receive a code search query from the prediction module 231, and subsequently determine a list of data sources for the search. In one implementation, the search module 233 may retrieve a pre-defined list of data sources that have been pre-categorized as coding library related, such as StackOverflow, Tutorial Point, and/or the like. In another implementation, the search module 233 may use a prediction module to predict prioritized data sources for the search based on a concatenation of the code search query, coding activity 504 and/or other context information 505, in a similar manner as described in co-pending and commonly-owned U.S. nonprovisional application Ser. No. 17/981,102, filed Nov. 4, 2022.

The search module 233 may then send a coding search query, customized for each identified data source, to the respective search APIs 522a-n and receive a list of search results from the respective search APIs 522a-n.

In some embodiments, a rank module 234 may optionally rank a list of search apps 522a-n to conduct the search. Each search applications 522a-n corresponds to a particular data sources 103a-n in FIG. 1. For example, search app 522a corresponds to a search application that is configured to search within the database of "StackOverflow"; search app 522b corresponds to a search application that is configured to search within the database of "Tutorial Point," and/or the like. The rank module 234 uses the input sequence including user query 502, coding activity 504, and other context 505 to score the plurality of search apps 522a-n, by running the input sequence through a neural network model once for each search app 522a-n. In this way, the rank module 234 may rank the search results from the list of data sources via search APIs 522a-n.

For example, if the user has constantly adopted code search results from "StackOverflow," and this information is reflected in other context 505, the rank module 234 may rank a search result from "StackOverflow" API higher.

Search results from the search APIs 522a-n are often in the forms of links to webpages or cloud files in the respective data sources. A ranked list of search results may be passed from the rank module 234 to the Extract module 232.

The Extract module 232 may follow the links of search results and extract code snippets from the contents on the webpages or cloud files. The code snippets 531a-n may then be delivered according to the ranked list based on their respective data sources. In one implementation, the extract module 232 may further verify whether the extracted code snippets from a webpage is complete, and may adjust the ranking by prioritizing high quality code snippet.

For example, the code snippets 531a-n are then transmitted to the user device for displaying via a graphical user interface or some other type of user output device. For example, code snippets 531a-n may be grouped and presented in the form of a list of user-engageable elements, each displaying an icon representing each respective search app (data source), e.g., within an IDE window, or within a browser window.

Figure 6:
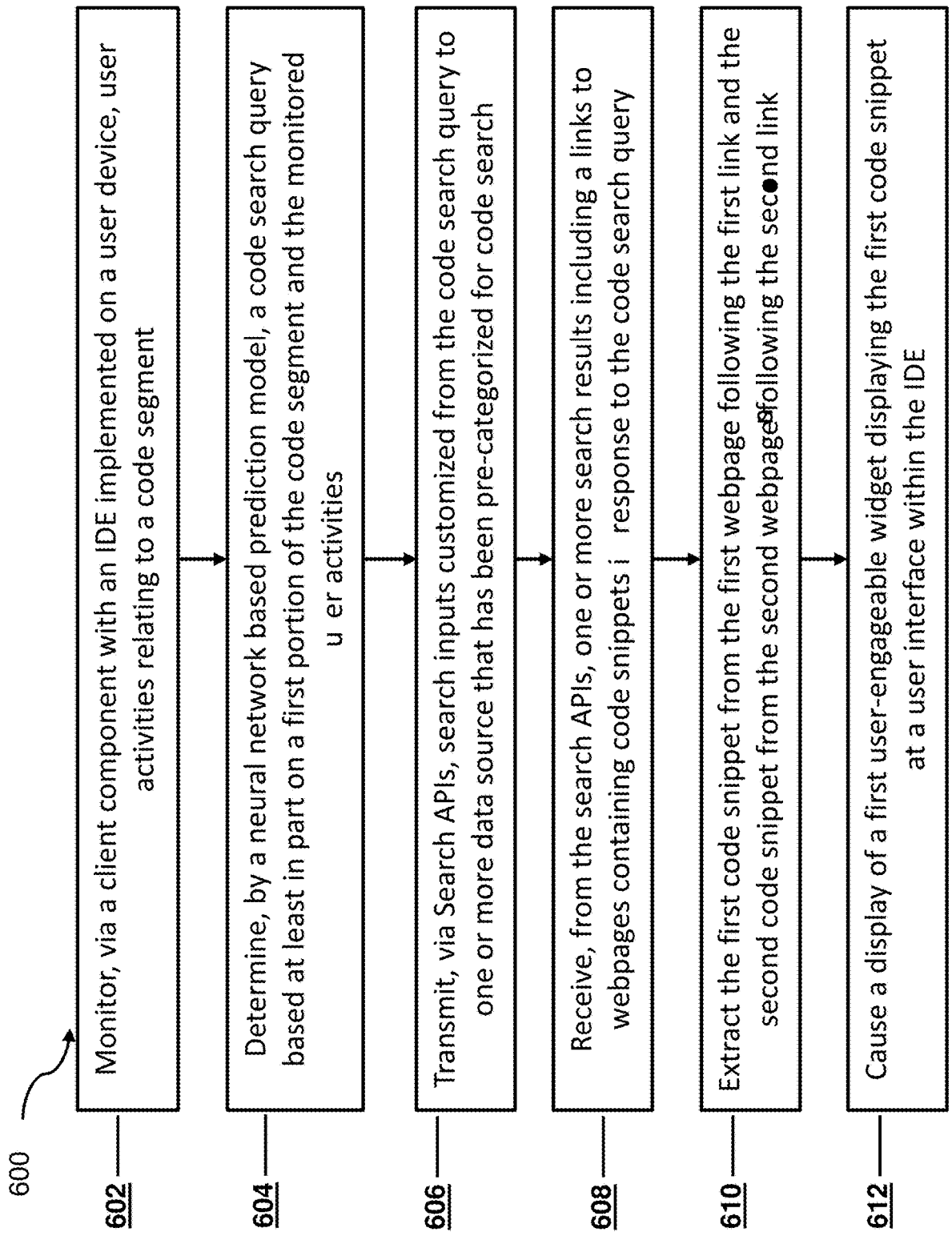
FIG. 6 is an example logic flow diagram illustrating a method of performing real-time code search in an IDE based on the code search framework and architecture shown in FIGS. 1-5, according to some embodiments described herein.

FIG. 6 is an example logic flow diagram illustrating a method of performing real-time code search in an IDE based on the code search framework and architecture shown in FIGS. 1-5, according to some embodiments described herein. One or more of the processes of method 600 may be implemented, at least in part, in the form of executable code stored on non-transitory, tangible, machine-readable media that when run by one or more processors may cause the one or more processors to perform one or more of the processes. In some embodiments, method 600 corresponds to the operation of the code search module 230 (e.g., FIGS. 2-5) that performs code search in response to monitored user coding activities and automatically return code snippets.

At step 602, a client component may be provided and installed with an IDE implemented on a user device (e.g., 120 in FIG. 1), and may monitor user activities (e.g., 122 in FIG. 1) relating to a code segment.

At step 604, a neural network based prediction model (e.g., 230 and/or its submodule 231 in FIGS. 2-5) implemented on one or more hardware processors at a search server (e.g., 110 in FIG. 1) may generate a code search query based at least in part on a first portion of the code segment and the monitored user activities that are received from the user device. For example, the code search query is determined further based on a user activity event indicative of a user intention for the code search, e.g., triggered by a long pause, user scrolling up and down a code segment, and/or the like. For another example, the code search query is determined further based on identifying an error within a first portion of the code segment.

At step 606, the search server may then transmit, via one or more search application programming interface (API) (e.g., 112a-n in FIG. 1, or 522a-n in FIG. 5) over a network (e.g., 460 in FIG. 4), one or more search inputs customized from the code search query to corresponding data sources (e.g., 103a-n in FIG. 1) that has been pre-categorized for code search.

At step 608, the search server may receive, from the one or more search APIs, search results including links to webpages containing code snippets in response to the code search query.

At step 610, the search server may extract code snippets from the webpages following the links. In some implementations, a rank model (e.g., 234 in FIGS. 2 and 5) may rank the search results and thus cause a display of the code snippets according to the ranking at a user interface within the IDE.

At step 612, the search server may send the code snippets to the user device, thereby causing a display of user-engageable widgets displaying the code snippets at a user interface within the IDE. For example, each user-engageable widget may take a form of a panel having a visual element indicating the data source, e.g., "Stack Overflow," and/or the like. Upon step 612, the client component receives a user selection of the first code snippet, thereby causing automatic integration of the first code snippet into the code segment upon the user selection. For example, the automatic integration of the first code snippet comprises a replacement of a sub-portion of the code segment that has been identified as relating to a code error with the first code snippet.

In some implementations, steps 604-610 may be performed at the search server (e.g., 110 in FIG. 1). In another implementation, any of steps 604-610 may be performed by the client component at the user device. For example, a client component installed within the IDE at a user device may determine when to trigger step 604 from step 602. When the client component has detected that the user has been pausing at a line of code for more than a period of time (e.g., 5 min, 10 min, etc.), scrolling up and down a segment of code, entering a question in the comment section, and/or the like, the client component may send such coding activities and relevant code sections to the search server. The search server may in turn engage the NLP model to generate the code search query.

FIGS. 7A-7C provide example UI diagrams illustrating automatic code search within an IDE, according to embodiments described herein. In some embodiments, as shown in FIG. 7A, the search system may identify errors in the user's written code based on user coding activities. The detected error may trigger the prediction module 231 in FIGS. 2 and 5 to generate a code search query based on the user coding activities and other context. and provide in-line suggests to the user. Thus, the search system may identify errors in the user's written code without prompting, and provide in-line suggestions to the user of code that may solve the errors and be syntactically correct. In such embodiments, the search system may utilize the contextual information 505 in FIG. 5, identify one or more code snippets from the search results. In some embodiments, the search results may instead be shown as code snippets included in-line in the text, where the user can indicate whether to accept the search result, view a different search result, or ignore the search result. This code may replace one or more lines of written code, or may be inserted in one or more new lines of the code, as determined by the search system or the user.

To detect an error in the code, for example, the search system may use natural language processing to parse a comment inserted into the written code by a user, identify areas in the code that do and do not match the user's comment, and provide suggestions for code that may achieve the functional desired by the user as written in the user's comment. Accordingly, the search system can identify when written code does not match the intent of the user and propose fixes to the code. In some embodiments, the search system may utilize a neural network to identify errors or mismatches with the user's intent and provide suggestions or fixes to the code In some embodiments, as shown in FIG. 7B, the search system use natural language processing to parse a comment (e.g., "#python open file") inserted into the written code by the user and identify potential search queries that may be useful to the user, performing a search and showing search results on a side panel. As shown in FIG. 7C, the user may select "Try solution 0" to automatically incorporate the code snippet into the code.

Figure 8A:
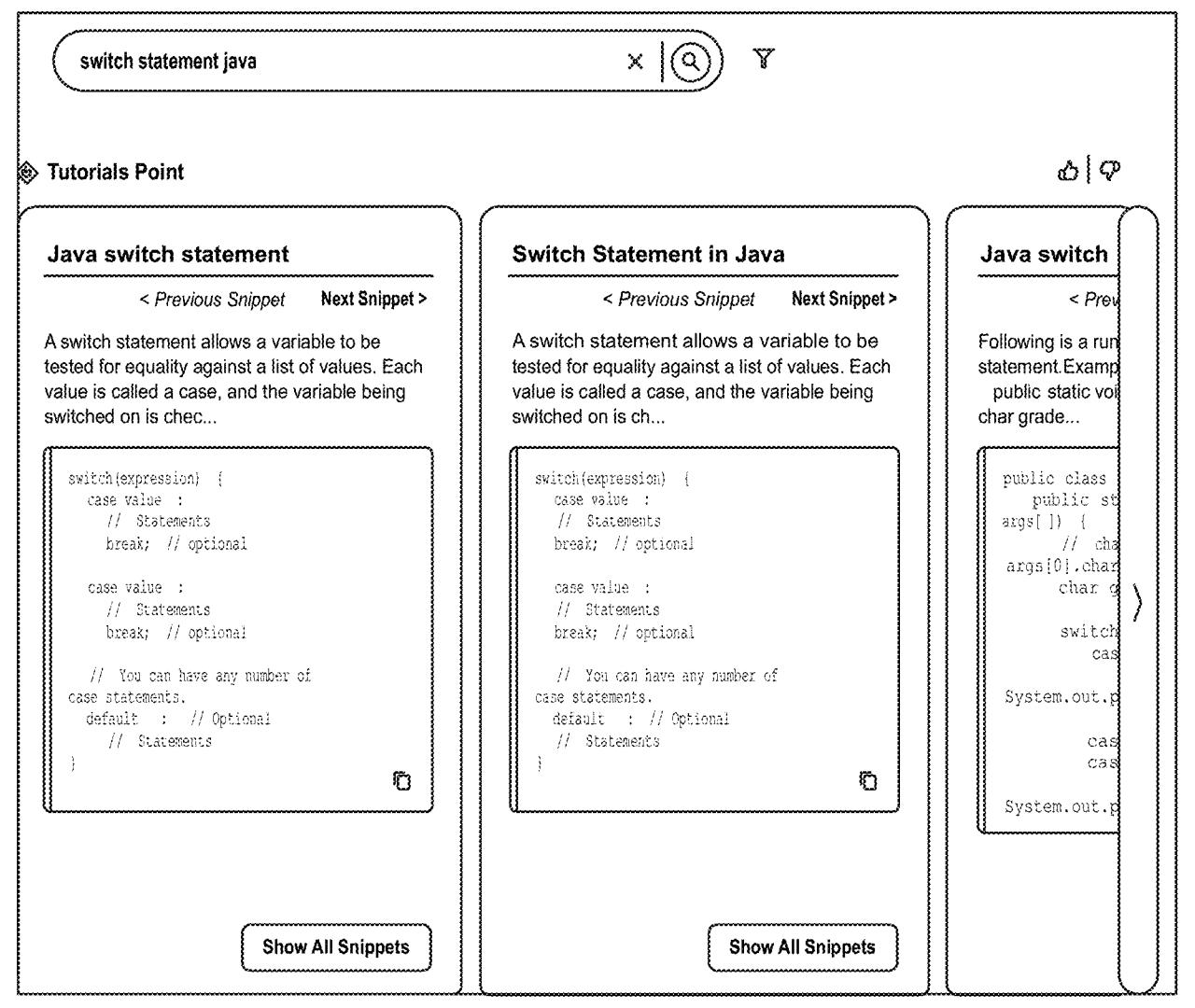

FIGS. 8A-8D provide example UI diagrams illustrating code search within a search browser window, according to embodiments described herein. In one example, a user may be writing a "switch statement" in Java. In a traditional search, a list of results may be presented to the user, where the user will then have to visit each web link to find code examples. As shown in FIG. 8A, in a search for "switch statement java," the search result may be a list of code snippets presented on panels, rather than a direct link to a website, the search system extracts relevant code snippets and display the results in panels on the search screen. For instance, these code snippets may appear in a collection of panels from a tutorial-based website. A user can then scroll through the snippet panels to view different results or opt to see more information related to the snippet in a particular panel.

Figure 8B:
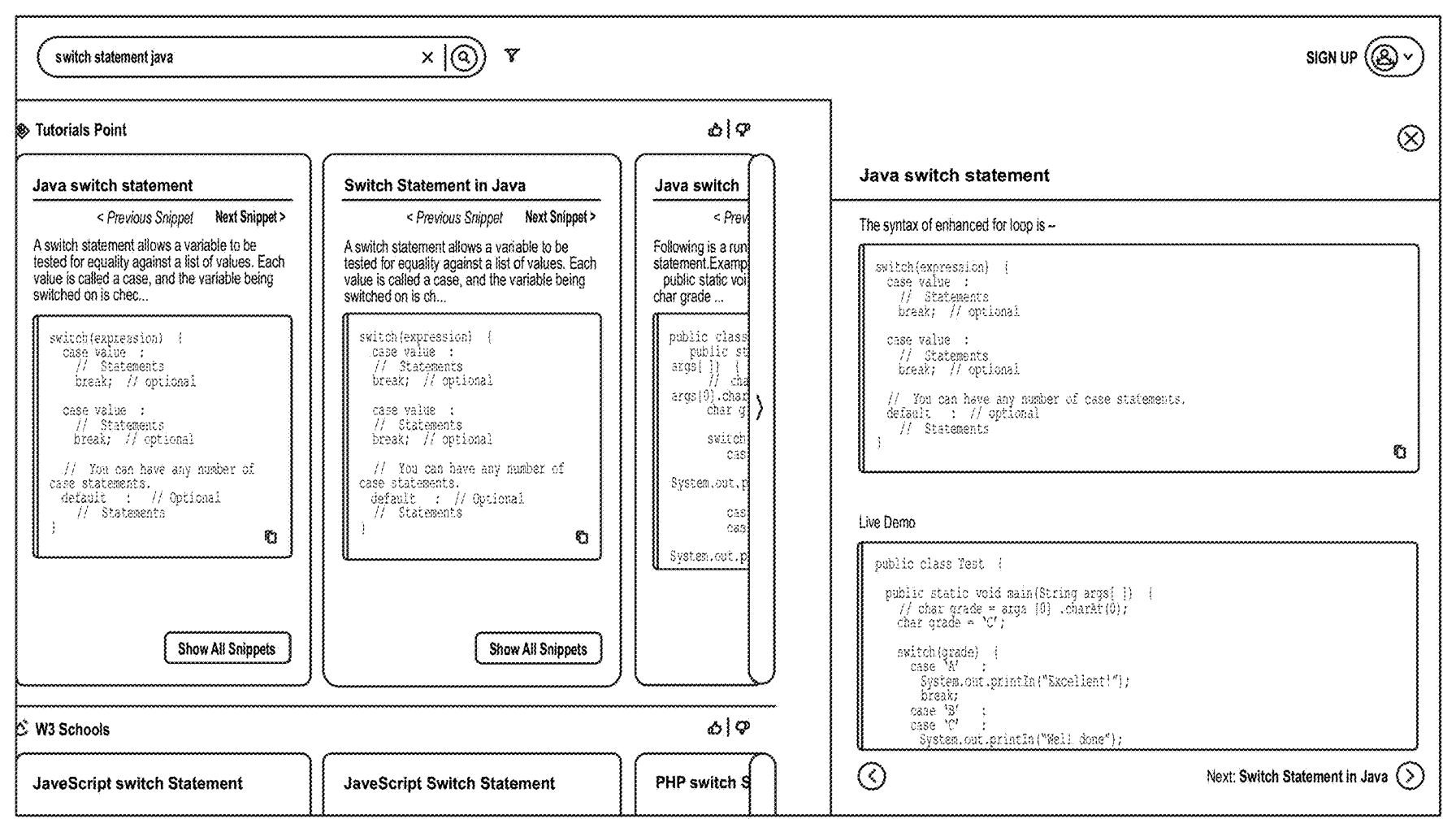

As shown in FIG. 8B, in another example, when a user may determine that they want to see all snippets from a selected source, and the search system can then display the snippets in a side panel. These panels may display information that the search system determines is relevant to the search query, such as the code snippets and corresponding text explaining the code snippets. Various results from a single source can be collected by the search system and multiple panels can be generated, which a user may then scroll through to view various approaches or information related to the search query.

Figure 8C:
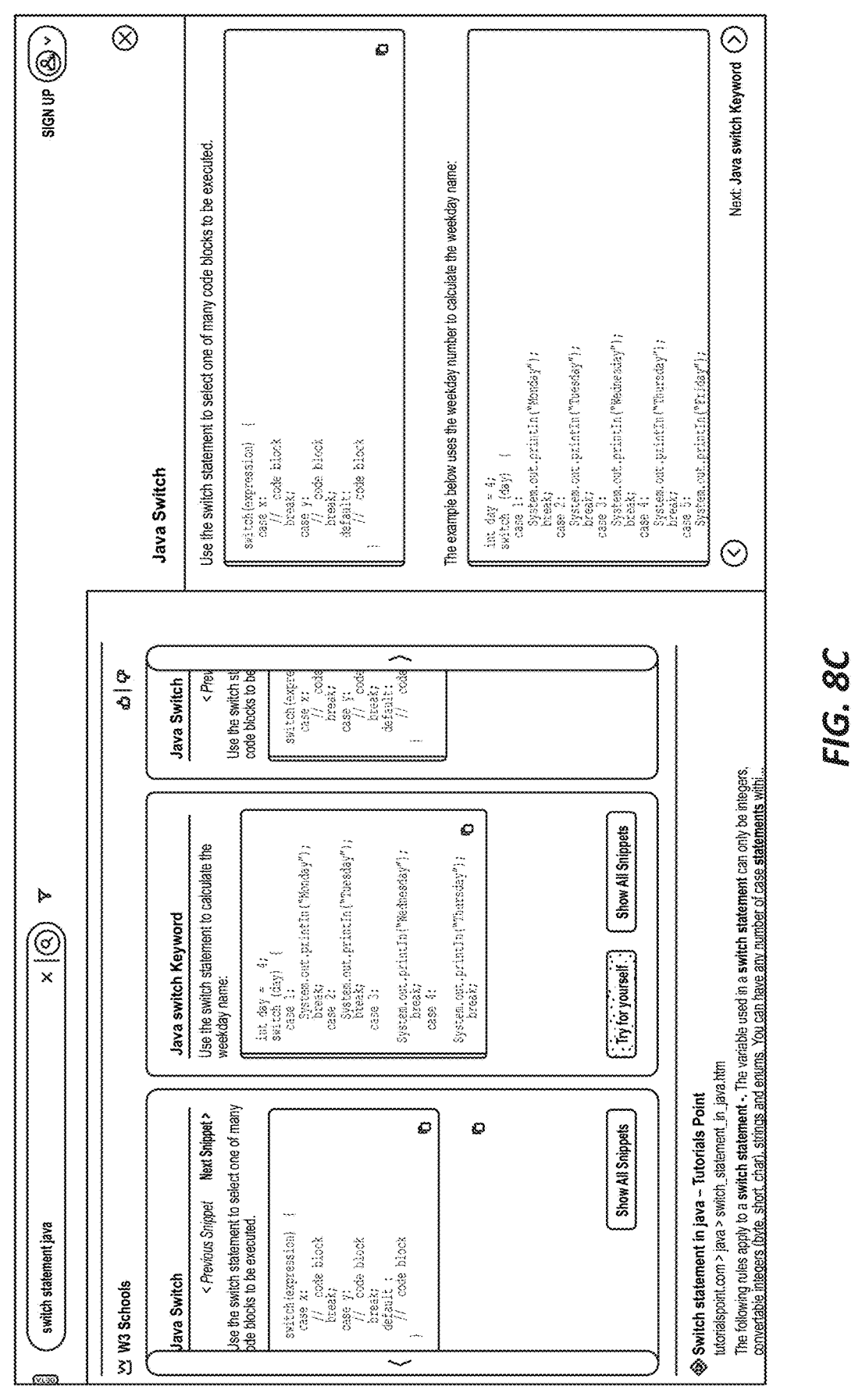

As shown in FIG. 8C, a user may select a "try for your self" button such that the code snippet in the respective panel may be copied to a clipboard, and the user may paste it into an IDE.

Figure 8D:
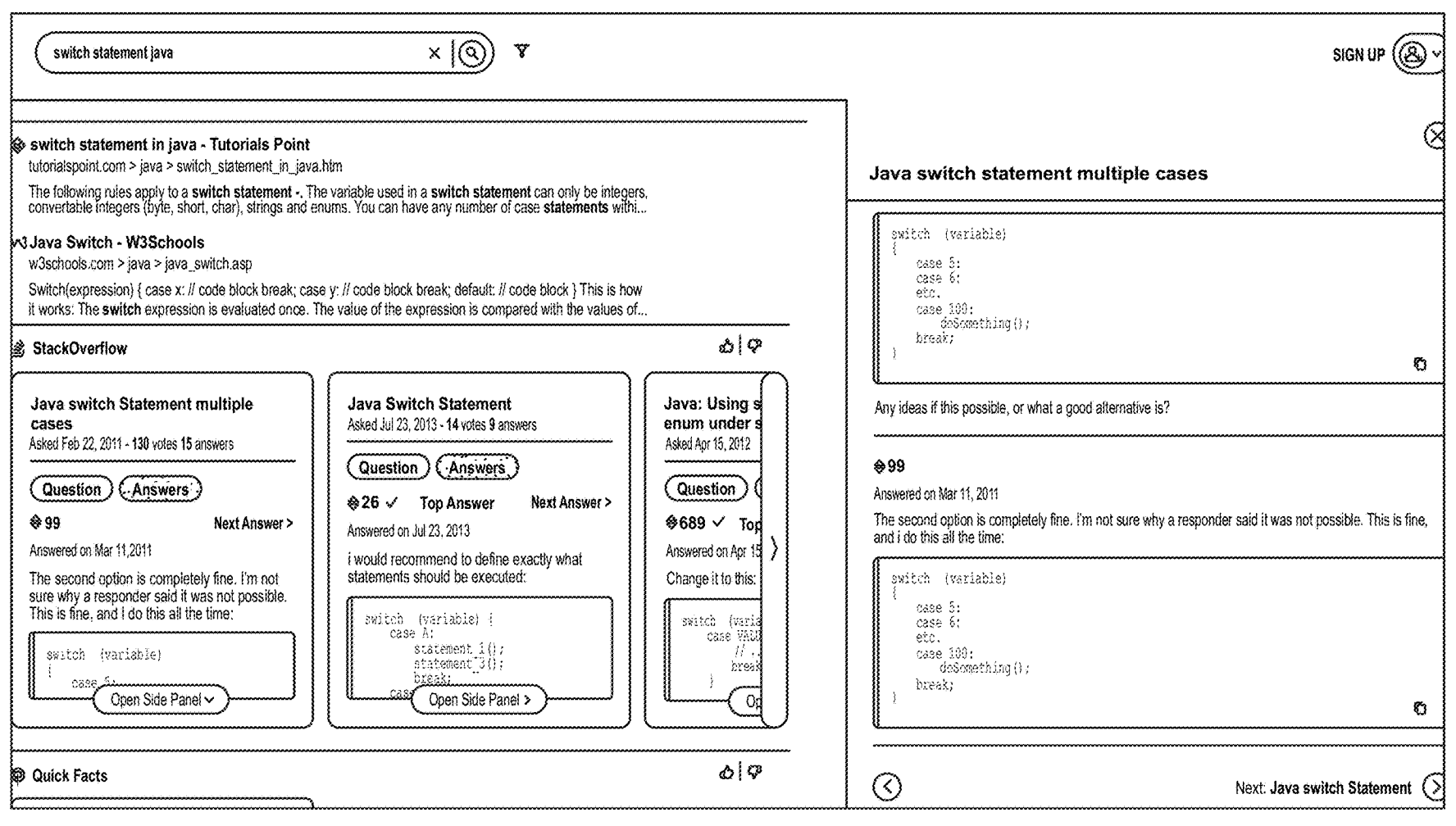

As shown in FIG. 8D, for another example, for data sources that are discussion forums, such as Stack Overflow, such forum may contain one or more answers in response to a question that is similar to the search query. The panels may include the question and related code snippets, as well as all code snippets from the answers and corresponding explanations and comments. A user can scroll through different forum questions and responses related to a search query in the same way as other code snippets.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A processor-implemented method of performing a real-time code search, the method comprising:
   receiving, from a user device and at a search server, a user input relating to a code program;
   generating, by a neural network based prediction model implemented on one or more hardware processors at the search server, a code search query based at least in part on the user input;
   transmitting, via a first search application programming interface (API) over a network, a first search input customized from the code search query to a first data source that has been pre-categorized for code search;
   receiving, from the first search API, a first search result including a first link to a first webpage containing a first code snippet in response to the code search query;
   extracting the first code snippet from the first webpage following the first link; and
   transmitting, to the user device, the extracted first code snippet taking a format that is to be directly incorporated into a coding environment.

2. The method of claim 1, wherein the user input comprises a text description describing the code program.

3. The method of claim 1, wherein the user input comprises one or more user entered code segments in the coding environment.

4. The method of claim 1, wherein the user input comprises real-time user coding activities within the coding environment, and wherein the code search query is generated further in response to detecting a user activity event indicative of a user intention for the code search from the real-time user coding activities, wherein the user activity event comprises one or more of:
   a pause in user input;
   a scrolling movement around at least a segment of the one or more user entered code segments; and
   an error detection within the one or more user entered code segments.

5. The method of claim 1, wherein the transmitting, to the user device, the extracted first code snippet causes a display of a first user-engageable widget displaying the first code snippet at the user device.

6. The method of claim 4, further comprising:
   transmitting, via a second search application programming interface (API) and over the network, a second search input customized from the code search query to a second data source that has been pre-categorized for code search;
   receiving, from the second search API, a second search result including a second link to a second webpage containing a second code snippet in response to the code search query;
   extracting the second code snippet from the second webpage following the second link;
   ranking, by a ranker model, the first search result and the second search result; and
   causing a display of the first user-engageable widget displaying the first code snippet and a second user-engageable widget displaying the second code snippet according to the ranking at a user interface of the user device.

7. The method of claim 5, wherein the first user-engageable widget includes a visual element indicating the first data source.

8. The method of claim 1, wherein the transmitting, to the user device, the extracted first code snippet causes an integration of the extracted first code snippet into the coding environment.

9. A system for performing a real-time code search, the system comprising:
   a communication interface that receives, from a user device, a user input relating to a code program;
   a memory storing neural network based models and a plurality of processor-executable instructions; and
   one or more processors executing the instructions to perform operations comprising:
      generating, by a neural network based prediction model implemented on one or more hardware processors at the search server, a code search query based at least in part on the user input;
      transmitting, via a first search application programming interface (API) over a network, a first search input customized from the code search query to a first data source that has been pre-categorized for code search;
      receiving, from the first search API, a first search result including a first link to a first webpage containing a first code snippet in response to the code search query;
      extracting the first code snippet from the first webpage following the first link; and
   wherein the communication interface transmits, to the user device, the extracted first code snippet taking a format that is to be directly incorporated into a coding environment.

10. The system of claim 9, wherein the user input comprises a text description describing the code program.

11. The system of claim 9, wherein the user input comprises one or more user entered code segments in the coding environment.

12. The system of claim 9, wherein the user input comprises real-time user coding activities within the coding environment, and wherein the code search query is generated further in response to detecting a user activity event indicative of a user intention for the code search from the real-time user coding activities, wherein the user activity event comprises one or more of:
   a pause in user input;
   a scrolling movement around at least a segment of the one or more user entered code segments; and
   an error detection within the one or more user entered code segments.

13. The system of claim 9, wherein the operation of transmitting, to the user device, the extracted first code snippet causes a display of a first user-engageable widget displaying the first code snippet at the user device.

14. The system of claim 13, wherein the operations further comprise:
   transmitting, via a second search application programming interface (API) and over the network, a second search input customized from the code search query to a second data source that has been pre-categorized for code search;
   receiving, from the second search API, a second search result including a second link to a second webpage containing a second code snippet in response to the code search query;
   extracting the second code snippet from the second webpage following the second link;
   ranking, by a ranker model, the first search result and the second search result; and causing a display of the first user-engageable widget displaying the first code snippet and a second user-engageable widget displaying the second code snippet according to the ranking at a user interface of the user device.

15. The system of claim 13, wherein the first user-engageable widget includes a visual element indicating the first data source.

16. The system of claim 9, wherein the operation of transmitting, to the user device, the extracted first code snippet causes an integration of the extracted first code snippet into the coding environment.

17. A processor-readable non-transitory storage medium storing a plurality of processor-executable instructions for performing a real-time code search, the instructions being executed by one or more processors to perform operations comprising:
- receiving, from a user device and at a search server, a user input relating to a code program;
- generating, by a neural network based prediction model implemented on one or more hardware processors at the search server, a code search query based at least in part on the user input;
- transmitting, via a first search application programming interface (API) over a network, a first search input customized from the code search query to a first data source that has been pre-categorized for code search;
- receiving, from the first search API, a first search result including a first link to a first webpage containing a first code snippet in response to the code search query;
- extracting the first code snippet from the first webpage following the first link; and
- transmitting, to the user device, the extracted first code snippet taking a format that is to be directly incorporated into a coding environment.

18. The medium of claim 17, wherein the user input comprises a text description describing the code program.

19. The medium of claim 17, wherein the user input comprises one or more user entered code segments in the coding environment.

20. The medium of claim 17, wherein the user input comprises real-time user coding activities within the coding environment, and wherein the code search query is generated further in response to detecting a user activity event indicative of a user intention for the code search from the real-time user coding activities, wherein the user activity event comprises one or more of:
- a pause in user input;
- a scrolling movement around at least a segment of the one or more user entered code segments; and
- an error detection within the one or more user entered code segments.

* * * * *